United States Patent [19]

Wilkinson et al.

[11] 4,337,538
[45] Jun. 29, 1982

[54] DRIVE ASSEMBLY FOR A VIDEO RECORDER-PLAYBACK MACHINE

[75] Inventors: Richard L. Wilkinson, Torrance; John S. Winslow, Alta Dena, both of Calif.

[73] Assignee: Discovision Associates, Costa Mesa, Calif.

[21] Appl. No.: 198,696

[22] Filed: Oct. 20, 1980

[51] Int. Cl.³ .............................................. G11B 3/10
[52] U.S. Cl. .................................................. 369/223
[58] Field of Search ........................................ 369/223

[56] References Cited

U.S. PATENT DOCUMENTS 3,000,638 9/1961 Dennis ........................... 369/223 X
3,852,816 12/1974 Stewart ............................. 369/223

Primary Examiner—Harry N. Haroian
Attorney, Agent, or Firm—Ronald J. Clark

[57] ABSTRACT

A drive assembly for a video recorder-playback machine is provided for controlled linear translation of an optics carriage including an optical record-playback head in a radial direction with respect to a video information disc. The optics carriage is mounted for radial displacement along a linear track assembly, and is connected to a sleeve-type push block received about a precision lead screw. The push block is biased by a spring axially toward a floating center coupling which in turn couples the push block with limited axial misalignment against rotation with respect to a lead screw nut. Rotation of the lead screw causes axial translation of the lead screw nut for effecting corresponding linear translation of the push block and the optics carriage.

35 Claims, 8 Drawing Figures

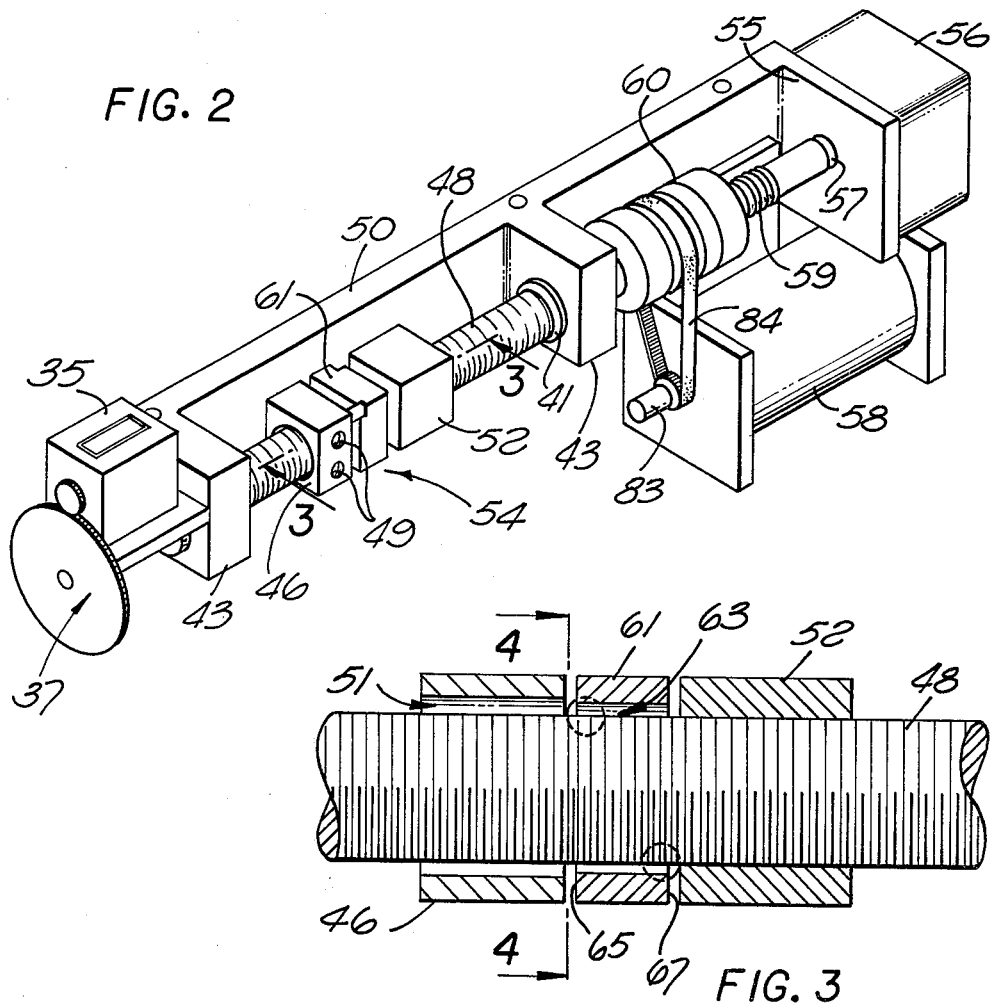
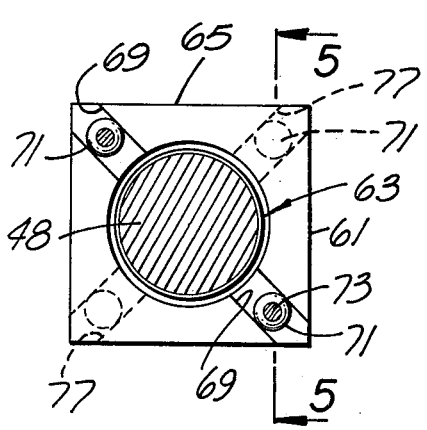
FIG. 2
FIG. 3
FIG. 4
FIG. 5

DRIVE ASSEMBLY FOR A VIDEO RECORDER-PLAYBACK MACHINE

BACKGROUND OF THE INVENTION

This invention relates generally to improvements in video recorder-playback machines, and more specifically, to an improved drive assembly for radially positioning an optics carriage including an optical record-playback head with respect to a video information disc.

Video recorder-playback machines in general are known in the art and include appropriate means for recording and/or playing back a video information signal utilizing a selected medium for storage of the signal. For example, in one type of machine, the video signal is recorded magnetically for storage and/or retrieval upon a length of so-called video tape. In another type of system, the video signal is recorded upon an information disc for retrieval by means of a stylus, in a manner generally analogous to that of sound reproduction from phonographic records. In still another type of system, the video signal is used to frequency modulate a beam of amplified light, such as a laser beam, with sufficient power for physically altering the surface characteristics of a light sensitive coating on a video information disc and thereby record the signal upon the disc. During playback, a lower power light beam is reflected from the disc and the resulting signal is demodulated to reproduce the recorded signal. In all of these types of systems, the video information signal can be combined with an appropriate audio signal for either recording or playback purposes to yield a composite audio-video signal of the type commonly used for television transmissions and the like. For convenience, however, the signal will be referred to herein as a video information signal.

Video recorder-playback machines utilizing amplified light beams for recording and playback purposes offer significant advantages in that all physical contact of the recording and playback elements with the storage medium, namely, the information disc, is avoided. This prevents wear and deterioration of the machine elements and the disc, resulting in a high quality stored video signal which can be played back repeatably over a long period of time with unimpaired video resolution.

In video recorder-playback machines using amplified light beams for signal recording and playback, the recording and playback optical beams are focused upon the video information disc by an optical record-playback head mounted on an optics carriage which traverses the span of the disc in a radial direction simultaneously with rotation of the disc. In this manner, a spiral pattern of closely spaced tracks is formed on the disc to represent the video information. For maximum storage capacity for each disc, together with optimum signal resolution, the information tracks are formed to have a narrow width such as on the order of about 0.5 microns, and the center-to-center spacing between radially adjacent tracks in the spiraling pattern is on the order of about 1.5 microns. Importantly, to prevent cross talk between the tracks during recording and/or playback operation, it is imperative that the optics carriage be translated in the radial direction at a precisely controlled and constant velocity.

In the prior art, a variety of lead screw mechanisms have been proposed for linearly translating the optics carriage of the machine. In these mechanisms, a precision lead screw carries a lead screw nut for axial displacement upon screw rotation. The nut is secured to the optics carriage whereby the record-playback head is shifted in a radial direction with respect to the information disc upon rotation of the lead screw. However, these prior art arrangements require direct physical connection between the lead screw nut and the optics carriage and thereby have necessitated a precise alignment and symmetric force loading arrangement between the lead screw and the optics carriage to avoid vibratory forces resulting from relatively slight binding between the components during operation. The result is that prior art lead screw drive mechanisms have been relatively complex and expensive in design, and have required a high degree of manufacturing skill and expertise in the proper assembly of the mechanism to assure satisfactory operation.

The present invention overcomes the problems and disadvantages of the prior art by providing an improved drive assembly for a video recorder-playback machine which radially and controllably shifts the positon of an optical record-playback head with respect to a video information disc.

SUMMARY OF THE INVENTION

In accordance with the invention, a drive assembly for a video recorder-playback machine is provided for smoothly and efficiently positioning an optics carriage including an optical record-playback head in a radial direction with respect to a rotating video information disc. The drive assembly of this invention is designed to provide a relatively simple arrangement for relatively smooth and accurate positioning of the record-playback head without undue vibrations or asymmetric loadings of the drive assembly components which could otherwise result in undesired cross talk between information tracks on the disc.

The drive assembly of this invention comprises a threaded precision lead screw mounted for rotation about its own axis in a support bracket, and rotatably driven at a closely controlled speed by suitable motor means. The lead screw threadably carries a lead screw nut for axial translation with respect to the screw upon screw rotation. The lead screw nut is coupled to a sleeve-type push block by means of a floating-center coupling which locks the push block and the lead screw nut against rotation with respect to each other while allowing limited axial misalignment of the components. The push block in turn is coupled directly to the optics carriage which supports the record-playback head for radial displacement with respect to the rotating video information disc.

The optics carriage is also mounted for radial displacement on a linear track assembly including a slide member secured to the optics carriage and linearly movable along a track member secured to the lead screw bracket. A constant force spring is connected between the screw bracket and the slide member, and operates to urge the slide member and the optics carriage in a direction to move the push block into axially bearing engagement with the floating-center coupling. In this manner, the push block and the coupling are maintained in axially bearing engagement with the lead screw nut.

When the lead screw is rotatably driven in one direction, the lead screw nut axially bears against the floating-center coupling and the push block to radially displace the optics carriage and the record-playback in one radial direction with respect to the disc. Rotation of the lead screw in the opposite direction axially translates the lead screw nut in the opposite direction whereby the push block and the coupling follow the lead screw nut under the influence of the constant force spring. Importantly, regardless of the direction of translation, the floating center coupling allows the lead screw nut and the push block to follow each other closely and accurately without requiring precise axial alignment therebetween, while maintaining a symmetric axial loading of the nut.

Other features and advantages of the present invention will become apparent from the following detailed description, taken in conjunction with the accompanying drawings, which illustrate by way of example the principles of the invention.

BRIEF DESCRIPTION OF THE DRAWINGS

The accompanying drawings illustrate the invention. In such drawings:

FIG. 2 is an enlarged perspective view of the drive assembly of this invention;

FIG. 3 is an enlarged fragmented vertical section taken on the line 3—3 of FIG. 2;

FIG. 4 is a vertical section taken on the line 4—4 of FIG. 3;

FIG. 5 is a fragmented vertical section taken on the line 5—5 of FIG. 4;

DETAILED DESCRIPTION OF THE PREFERRED EMBODIMENT

Figure 1:
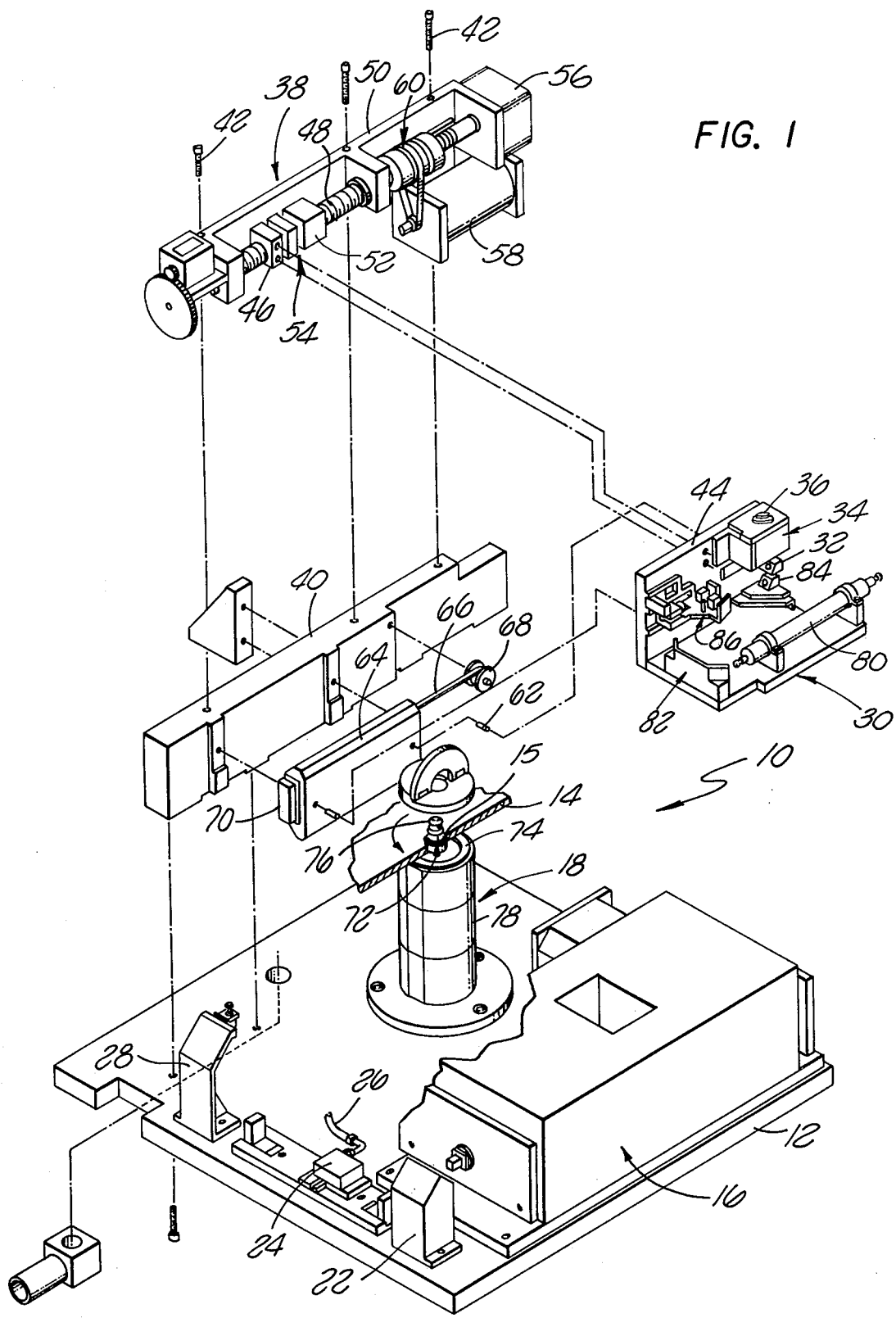
FIG. 1 is a fragmented perspective view illustrating, partially in exploded form, a video recorder-playback machine.
Figure 6:
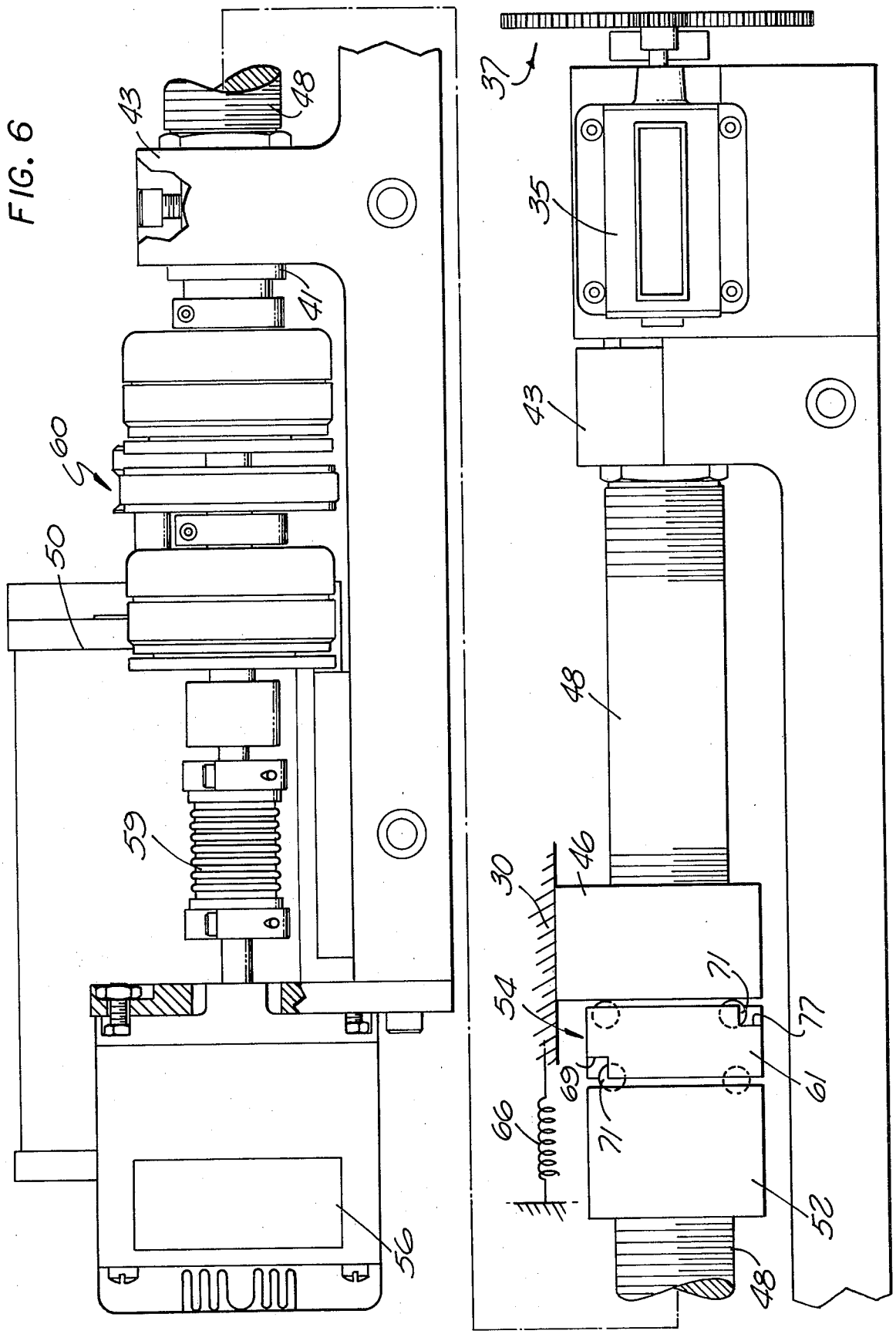
FIG. 6 is an enlarged fragmented top plan view of the drive assembly, with portions shown in schematic form.

As shown in the exemplary drawings, the present invention is embodied in a video recorder-playback machine 10 having suitable optical and electronic elements for recording and playback of video information from a video information disc 14. The information disc 14 is removably supported within the machine upon a spindle assembly 18 for controlled high speed rotation of the disc during the recording and playback operations. A clamp assembly 20 cooperates with the spindle assembly 18 to clamp the disc 14 in a precisely centered position for accurate, high speed rotation without radial eccentricities or rotational slippage. A record-playback head 34 is mounted on an optics carriage 30 and is linearly translated in a radial direction with respect to the disc 14 simultaneously with disc rotation by means of a linear drive assembly 38 of this invention. In operation, appropriate optical signals are focused upon the disc 14 as will be described herein by the record-playback head 34 for storage and/or retrieval of a video information signal on the disc.

The machine 10, including the linear drive assembly 38 of this invention, comprises an improvement over the prior art in that the drive assembly 38 is designed for controlled and relatively smooth linear translation of the optics carriage 30 and the record-playback head 34 without requiring precision alignment between the driving and driven components. Moreover, the drive assembly 38 provides a relatively simple and inexpensive arrangement for assuring symmetric loading of the driving components to avoid vibrations and the like occuring as a result of relatively slight binding of the components which could otherwise cause undesired impairment of the recorded or retrieved video information signal.

As shown in FIG. 1, the video recorder-playback machine 10 includes a machine base 12 which provides support for a relatively high power laser generator unit 16, such as an argon ion laser, for use in recording a prescribed video information signal upon the disc 14. The high power laser generator unit 16 emits a highly amplified collimated beam of light for redirection by a suitable mirror assembly 22 to an electronically driven modulator 24. The modulator 24 is driven by a suitable frequency modulated electronic signal supplied via an input lead 26 wherein the electronic signal is representative of the desired video information. The modulator 24 responds to the electronic signal to interrupt appropriately the amplified beam of light to pass a correspondingly modulated optical signal beam. The resultant optical signal beam is therefore representative of the prescribed video information. Conveniently, in many instances, the electronic signal comprises a composite audio-video signal of the type commonly used in television transmissions and which, when supplied to the modulator 24, yields an optical signal beam representative of the composite audio and video information. However, for sake of clarity and ease of description, all further reference herein will be to video information.

The modulated optical signal beam is incident upon a second mirror assembly 28 for redirection to the optics carriage 30. This optics carriage 30 includes an angularly disposed dichroic mirror 32 for reflection of the optical signal beam in an upward direction for passage through the record-playback head 34. The record-playback head 34 carries an objective lens assembly 36 for focusing the optical signal beam to a precise spot on the underside of the video information disc 14.

The optics carriage 30 is movably positioned along a linear path in a radial direction with respect to the disc 14 by the linear drive assembly 38. In this manner, the objective lens assembly 36 is movably positioned with respect to the disc 14 along a radius of the disc to control the point of focusing of the optical signal beam upon the disc. At the same time, and in synchronism with radial translation of the record-playback head 34, the video information disc 14 is rotatably driven about a vertical axis by the spindle assembly 18.

More specifically, the disc 14 is vertically supported upon a rotatable drive spindle 72 including an upwardly extending annular shoulder 74 for vertically supporting the disc and an upper shaft portion 76 received through a central opening 15 formed in the disc. The drive spindle 72 is carried within an upright spindle housing 78 which is secured to the machine base 12 and supports the spindle 72 for relatively high speed rotation, such as on the order of about 1800 rpm, about its vertical axis. A drive motor (not shown) is drivingly coupled to the spindle 72 for rotating the spindle at the relatively high speed of rotation. The clamp assembly 20 is receivable over the upper shaft portion 76 of the spindle 72 for locking the disc in a precisely centered position for high speed rotation.

Further details of the spindle assembly 18 are set forth in concurrently filed and copending U.S. application Serial No. (DKT. No. 80024), entitled SPINDLE ASSEMBLY FOR A VIDEO RECORDER-PLAYBACK MACHINE, and further specific details of the construction and operation of the clamp assembly 20 are described in concurrently filed and copending U.S. application Ser. No. 198,694, Oct. 20, 1980 entitled CLAMP ASSEMBLY FOR A VIDEO RECORDER-PLAYBACK MACHINE, both of which are incorporated by reference herein.

In operation, the optical signal beam is focused upon the underside of the video information disc 14 by the radially traversing objective lens assembly 36 on the optics carriage 30 simultaneously with high speed rotation of the disc. By appropriately controlling the relationship between radial traversal and rotational speed, the optical signal beam is focused upon the disc along a spiraling pattern of closely spaced tracks. Importantly, the disc 14 includes a photosensitive coating such as a layer of thin metal or a photoresist material, adapted to be physically altered by the high power optical signal beam whereby the optical signal beam is physically recorded upon the disc as a pattern of discontinuities representative of the prescribed video information. In practice, the closely spaced tracks have a width on the order of about 0.5 microns, and a center-to-center spacing of about 1.5 microns.

As illustrated in FIG. 1, a relatively low power laser generator unit 80, such as a helium-neon laser, is mounted directly upon the optics carriage 30 for use in retrieval or playing back the recorded video information from the disc 14. This low power laser generator unit 80 emits an amplified and collimated beam of light for reflection off the disc 14 whereby the reflected optical beam comprises a modulated playback beam which is alternately reflected and nonreflected in accordance with the recorded video information. This modulated playback beam is of sufficiently low power to avoid physical alteration of the photosensitive coating on the disc 14.

The amplified beam of light from the low power laser generator unit 80 is redirected by a suitable mirror assembly 82 on the optics carriage 30 for appropriate incidence upon an angularly oriented mirror 84 which reflects the beam upwardly through the dichroic mirror 32 for focusing upon the disc 14 by the objective lens assembly 36. The reflected modulated playback beam is returned through the lens assembly 36 and by the mirror 84 to appropriate optical and electronic components 86 for demodulating the playback beam to the form of an electronic signal representative of the prescribed video information. This electronic signal can be supplied to an appropriate video display device, such as a television receiver, for playback of the recorded video information. Importantly, playback can occur independently of the recording function or substantially simultaneously with the recording function to serve as a check of the recording resolution.

Further details of the optical components of the recorder-playback machine 10 are described in concurrently filed and copending U.S. application Ser. No. 198,693, Oct. 20, 1980, entitled VIDEO RECORDER-PLAYBACK MACHINE, and further specific details of the record-playback head 34 are described in concurrently filed and copending U.S. application Ser. No. 198,697, Oct. 20, 1980 entitled LENS ASSEMBLY FOR A VIDEO RECORDER-PLAYBACK MACHINE, both of which are incorporated by reference herein.

The linear drive assembly 38 of this invention supports the optics carriage 30 and the optical record-playback head 34 for linear translation in the radial direction with respect to the video information disc 14. The drive assembly 38 further provides means for smooth, controlled driving of the carriage 30 and head 34 without binding and without requiring a precise alignment of the driving and driven components.

The optics carriage 30 is supported for linear translation upon a linear track assembly carried by a support frame 40 which is fixed by a plurality of bolts 42 to the machine base 12. This linear track assembly comprises a linear slide member 64 secured by pins 62 to an upright wall 44 of the optics carriage 30. The slide member 64 is guided for linear movement upon a track member 70 suitably secured to the support frame 40, as illustrated in FIG. 1. An appropriate linear sliding or rolling interface, such as a ball or roller structure (not shown) is provided between the slide and track members 64 and 70 for smooth, substantially vibration-free linear motion of the slide member 64. Importantly, this direction of linear motion is aligned in parallel with the radial direction of desired displacement of the record-playback head 34 so that the head 34 is constrained for linear translation along the radius of the disc 14.

A tension spring 66 in the form of a substantially constant tension band spring is provided for urging the slide member 64, and thus also the optics carriage 30 and associated record-playback head 34, toward one end limit of the allowable linear displacement. This spring 66 is suitably connected between one end of the slide member 64 and a tension barrel 68 which is mounted on the support frame 40 for rotation about its axis. The normal spring tension in the band spring 66 tends to wind the spring about the barrel 68 and thereby draw the slide member 64 linearly along the track member 70 toward the barrel 68. This correspondingly urges the optics carriage 30 and the record-playback head 34 along a linear path radially toward the axial center of the information disc 14.

Linear translation of the optics carriage 30 and the record-playback head 34 is controlled by a lead screw mechanism forming the driving portion of the drive assembly 38, and is illustrated in FIGS. 2-6. As illustrated, the lead screw mechanism comprises a threaded precision lead screw 48 which is carried for rotation about its own axis within bushings 41 received within laterally projecting arms 43 of a support bracket 50. Conveniently, this support bracket 50 is mounted atop the support frame 40 carrying the track assembly and is fixed to the machine base 12 along with the frame 40 by the plurality of bolts 42.

A lead screw nut 52 is threadably received upon the lead screw 48 between the bracket arms 43 and is axially translatable along the lead screw 48 upon rotation of the lead screw. Importantly, for reasons which will become more apparent, the lead screw 48 is positioned generally in parallel with the direction of linear translation of the carriage 30 and head 34, and the spacing between the bracket arms 43 is chosen to allow axial translation of the lead screw nut 52 for a distance at least slightly in excess of the required linear translation of the carriage 30 and head 34.

The lead screw nut 52 is coupled through a floating-center coupling 54 to a sleeve-type push block 46 received concentrically about the lead screw 48. This push block 46 includes a pair of threaded openings 49 for reception of screws (not shown) for connecting the push block 46 directly to the upright wall 44 of the optics carriage 30. As illustrated, the push block 46 is configured with an inner diameter to have substantial radial clearance about the lead screw 48, as indicated by arrow 51 in FIG. 3. This clearance is sufficient to be maintained upon linear translation of the carriage 30 and head 34 with respect to the linear track assembly, which results in a corresponding axial translation of the push block 46 along the lead screw 48. Importantly, this clearance removes the necessity of a precise parallel alignment between the lead screw 48 and the path of motion of the push block 46.

The floating-center coupling 54 is provided for coupling the push block 46 against rotation with respect to the lead screw nut 52, while at the same time accommodating any axial misalignment between the push block 46 and the lead screw nut 52. More specifically, this coupling 54 comprises an Oldham-type coupling in the form of a coupling block 61 received about the lead screw 48. Similar to the push block 46, the coupling block 61 has an inner diameter, illustrated at 63, with sufficient clearance to avoid contact with the lead screw 48 during axial translation thereof, as will be described.

The coupling block 61 has one axial face 67 presented toward the lead screw nut 52 and an opposite axial face 65 presented toward the push block 46. The axial face 65 is shown in FIG. 4 and includes a pair of radially extending recesses 69 formed in diametrically opposed relation. These recesses 69 each have a vertical and a horizontal component of direction and are sized for relatively close reception of a pair of coupling balls 71. These coupling balls 71 are formed integrally with threaded shafts 73, which are secured within threaded bores 75 within the lead screw nut 52.

In a similar manner, the axial face 67 of the coupling block 61 includes a pair of radially extending recesses 77 formed in diametrically opposed relation, and each has a vertical and a horizontal component of direction. However, the recesses 77 are angularly offset with respect to the recesses 69 in the opposite face 65, such as by ninety degrees as illustrated in FIG. 4. These latter recesses 77 are sized for relatively close reception of a second pair of the coupling balls 71 having their threaded shafts 73 secured within threaded bores 81 in the push block 46.

The coupling balls 71, received within the opposed pairs of angularly offset recesses 69 and 77, serve to support the coupling block 61 generally concentrically about the lead screw 48 and generally in axial alignment with both the lead screw nut 52 and the push block 46. To the extent that the nut 52 and the push block 46 are axially misaligned with each other, the coupling block 61 accommodates the axial misalignment while maintaining the nut 52 and the push block 46 against rotation relative to each other.

With reference to FIG. 1, the constant tension band spring 66 urges the carriage 30 in a direction toward the axial center of the disc 14. The floating-center coupling 54 and the lead screw nut are positioned on the appropriate side of the push block 46 whereby the push block 46 is at all times urged by the spring 66 into axial bearing engagement with the coupling 54 which in turn bears against the nut 52. This spring force action is illustrated schematically in FIG. 6. Accordingly, the spring 66 urges the push block 46 and the lead screw nut 52 into a normally coupled relationship whereby the push block 46 will follow axial translation of the lead screw nut 52.

In operation, the lead screw 48 is rotatably driven about its own axis by a relatively low speed electric motor 56, such as a reversible dc motor for driving the screw 48 at a constant and reversible rotational speed. This motor 56 is mounted on a laterally projecting arm 55 of the support bracket 50, and has a motor shaft 57 secured to a suitable flexible coupling 59, such as a metal bellows coupling. The coupling 59 is in turn secured to a clutch unit 60 which can be selectively operated in a known manner to couple rotation of the motor shaft 57 to one end of the lead screw 48.

Rotation of the lead screw 48 in one direction causes the lead screw nut 52 to translate axially in a direction away from the coupling 54 and the push block 46. The constant tension spring 66 causes the coupling 54 and the push block 46 to follow the axial translation of the nut 52, and thereby also causes the optics carriage 30 and the record-playback head 34 to traverse radially inwardly with respect to the video information disc 14. When the disc 14 is simultaneously rotated, the machine 10 is operable to record and/or play back video information.

Rotation of the lead screw 48 in an opposite direction causes the lead screw nut 52 to translate axially in a direction toward the coupling 54 and the push block 46. This results in linear traversal of the optics carriage 30 and the record-playback head 34 in a radially outward direction with respect to the video information disc 14. In operation of the machine 10, this direction of traversal corresponds with reverse playback of the video information, or alternately, with return of the head 34 to a start position for recording and/or playback upon a disc 14. Conveniently, in either direction of lead screw rotation, a counter unit 35 coupled to the lead screw 48 via suitable gearing 37 provides an indication of the radial position of the record-playback head 34 with respect to the disc 14.

A relatively high speed electric motor 58 such as a reversible dc motor is also provided for driving the lead screw 48 at a relatively high and reversible rotational speed. This high speed motor 58 includes a motor shaft 83 coupled to the clutch unit 60 via a belt 84, such as a cog belt. The clutch unit 60 is appropriately operated when desired to couple the output of the high speed motor 58 to the lead screw 48 for effecting rapid axial translation of the lead screw nut 52 in either direction. This rapid translation of the nut 52 results in a corresponding rapid radial displacement of the optics carriage 30 and the record-playback head 34 in generally the same manner as described with respect to the low speed motor 56. In operation, the high speed motor 58 is used for radially translating the record-playback head 34 in a fast-forward mode or in a fast-reverse mode.

The clutch unit 60 is thus capable of operation to couple either the low speed motor 56 or the high speed motor 58 to the lead screw 48, or alternately, to disengage both motors 56 and 58 from the lead screw 48. Importantly, the clutch unit 60 is relatively conventional in design, construction, and control, and thus is not shown or described in further detail herein.

The drive assembly 38 of this invention provides a substantial improvement over the prior art in that precise axial alignment of the drive components, namely, the lead screw 48 and the lead screw nut 52, with the driven component in the form of the push block 46 is not required. The floating-center coupling 54 accommodates the axial misalignment whereby the components can be assembled without necessitating extremely close manufacturing and assembly tolerances. However, in spite of the allowable axial misalignment, the spring-loaded relationship of the push block 46 and the coupling 54 against the lead screw nut 52 assures that axial forces are applied annularly and uniformly to the nut 52. This uniform application of axial forces symmetrically loads the threaded interface between the nut 52 and the lead screw 48 to prevent binding and/or relatively slight vibration between the nut 52 and the screw 48 during operation of the machine. High quality signal recording and playback is thereby assured without cross talk between adjacent tracks on the disc 14.

Figure 7:
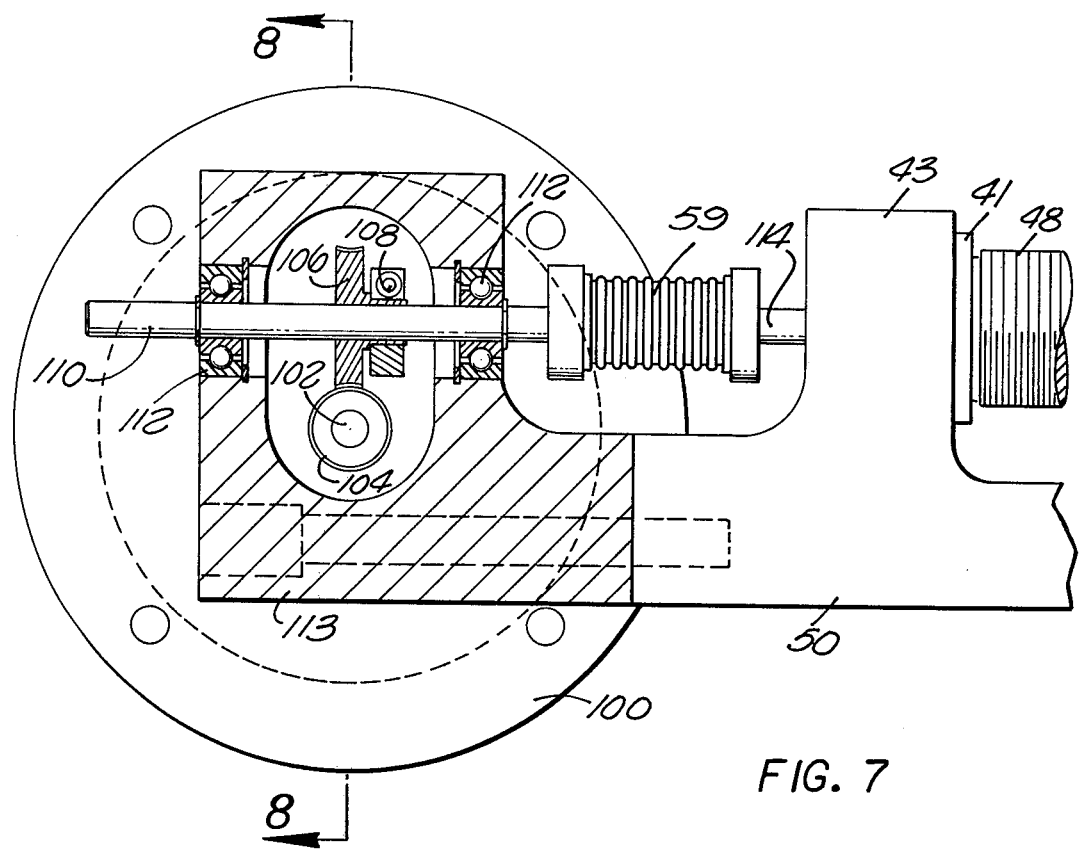
FIG. 7 is an enlarged fragmented top plan view showing an alternate embodiment of a portion of the drive assembly.
Figure 8:
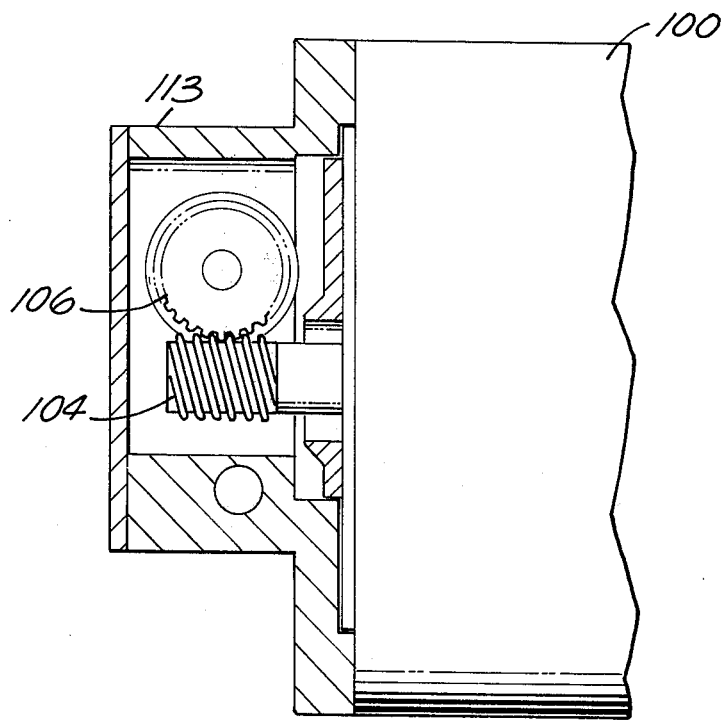
FIG. 8 is a vertical section taken on the line 8—8 of FIG. 7.

An alternate motor drive arrangement for rotatably driving the lead screw 48 is illustrated in FIGS. 7 and 8 with components common to the embodiment shown in FIGS. 1–6 being referred to with common reference numerals. As illustrated in FIGS. 7 and 8, the lead screw 48 is rotatably driven by a single motor 100 capable of variable speed reversible operation whereby the clutch unit 60 of FIGS. 1–6 is eliminated.

The variable speed motor 100 comprises a reversible dc motor for rotatably driving the lead screw 48 in either rotational direction throughout a range of low to high speeds. The motor 100 includes a vertically extending motor shaft 102 carrying a worm gear 104 at its upper end. The worm gear 104 is positioned in driving engagement with a pinion gear 106 secured by a collor 108 upon a horizontally extending transmission shaft 110. The transmission shaft 110 is carried by a pair of journal bearings 112, such as ball bearings, mounted within a protective cover housing 113 and is connected at one end to a flexible coupling 59. The flexible coupling in turn is secured to the adjacent end of the lead screw 48 wherein said adjacent end can take the form of a shaft portion 114 of reduced cross section.

A variety of modifications and improvements to the drive assembly of this invention are believed to be apparent to one skilled in the art. Accordingly, no limitation upon the invention is intended, except as set forth in the appended claims.

What is claimed is:

1. A drive assembly for linearly translating a record-playback head in a record-playback machine, comprising:
    a slide member mounted on the machine for linear translation with respect thereto, said head being mounted for linear movement with said slide member;
    a lead screw mounted on the machine for rotation about its own axis and extending in a direction generally parallel with the direction of translation of said slide member;
    a lead screw nut threadably received about said lead screw for axial translation in response to lead screw rotation;
    a push block mounted for linear movement with the head and disposed about said lead screw for axial translation with the head generally along said lead screw and out of physical contact with said lead screw;
    means for coupling said lead screw nut and said push block against rotation with respect to each other and for accommodating axial misalignment between each other; and
    means for rotatably driving said lead screw.

2. The drive assembly of claim 1 including a linear track member mounted on the machine, said slide member being mounted on said track member for linear movement with respect thereto.

3. The drive assembly of claim 1 including spring means for urging said slide member in one direction of linear movement.

4. The drive assembly of claim 3 wherein said spring means comprises a tension barrel rotatably mounted on the machine, and a substantially constant tension band spring connected between said barrel and said slide member.

5. The drive assembly of claim 1 wherein said means for rotatably driving said lead screw comprises a reversible variable speed dc motor.

6. The drive assembly of claim 1 wherein said means for rotatably driving said lead screw comprises a first relatively low speed reversible dc motor and a second relatively high speed reversible dc motor, and including clutch means for selectively coupling one of said first and second motors to said lead screw.

7. The drive assembly of claim 1 wherein said coupling means comprises a floating center coupling.

8. The drive assembly of claim 7 wherein said floating center coupling comprises a coupling block received about said lead screw between said push block and said lead screw nut and having an inner diameter sized for radial clearance with respect to said lead screw, and means for locking said coupling block against rotation with respect to said push block and said lead screw nut and for supporting said coupling block out of physical contact with said lead screw.

9. The drive assembly of claim 8 including spring means for urging said push block into substantially symmetric axial bearing engagement with said coupling block and thereby urge said coupling block into substantially symmetric axial bearing engagement with said lead screw nut.

10. The drive assembly of claim 8 wherein said coupling block has a first face presented axially toward said push block with at least two radially projecting recesses formed therein to extend with both horizontal and vertical components of direction, and a second face presented axially toward said lead screw nut with at least two radially projecting recesses formed therein to extend with both horizontal and vertical components of direction and radially offset with respect to the recesses formed in said first face, said locking means comprising pin means projecting axially from said push block and said lead screw nut for respective reception within said recesses in said first and second faces of said coupling block.

11. A drive assembly for linearly translating a record-playback head in a record-playback machine, comprising:
    a slide member mounted on the machine for linear translation with respect thereto, said head being mounted for linear movement with said slide member;
    a lead screw mounted on the machine for rotation about its own axis and extending in a direction generally parallel with the direction of translation of said slide member;
    a lead screw nut threadably received about said lead screw for axial translation in response to lead screw rotation;
    a push block mounted for linear movement with the head and received with radial clearance about said lead screw for axial translation with the head generally along said lead screw;

means for coupling said lead screw nut and said push block against rotation with respect to each other and for accommodating axial misalignment between each other;

means for reversibly rotatably driving said lead screw whereby rotation of said lead screw in a first direction causes axial translation of said lead screw nut in a direction toward said push block for causing corresponding axial translation of said push block and the head, and rotation of said lead screw in a second direction causes axial translation of said lead screw nut in a direction away from said push block; and means for causing said push block to follow said lead screw nut when said lead screw is rotated in said second direction.

12. Th drive assembly of claim 11 wherein said coupling means comprises a floating center coupling.

13. The drive assembly of claim 12 wherein said floating center coupling comprises a coupling block received about said lead screw between said push block and said lead screw nut and having an inner diameter sized for radial clearance with respect to said lead screw, and means for locking said coupling block against rotation with respect to said push block and said lead screw nut and for supporting said coupling block out of physical contact with said lead screw.

14. The drive assembly of claim 13 wherein said means for causing said push block to follow said lead screw nut comprises spring means for urging said push block into substantially symmetric axial bearing engagement with said coupling block and thereby urge said coupling block into substantially symmetric axial bearing engagement with said lead screw nut.

15. The drive assembly of claim 13 wherein said coupling block has a first face presented axially toward said push block with at least two radially projecting recesses formed therein to extend with both horizontal and vertical components of direction, and a second face presented axially toward said lead screw nut with at least two radially projecting recesses formed therein to extend with both horizontal and vertical components of direction and radially offset with respect to the recesses formed in said first face, said locking means comprising pin means projecting axially from said push block and said lead screw nut for respective reception within said recesses in said first and second faces of said coupling block.

16. A drive assembly for linearly translating a record-playback head in a record-playback machine, comprising:
 a slide member mounted on the machine for linear translation with respect thereto, said head being mounted for linear movement with said slide member;
 a lead screw mounted on the machine for rotation about its own axis and extending in a direction generally parallel with the direction of translation of said slide member;
 a lead screw nut threadably carried about said lead screw for axial translation with respect thereto in response to lead screw rotation;
 a push block mounted for linear movement with the head and disposed with radial clearance about said lead screw for axial translation with the head generally along said lead screw;
 means for coupling said lead screw nut and said push block against rotation with respect to each other and for accommodating axial misalignment between each other;
 means for maintaining said lead screw nut and said push block coupled against rotation with respect to each other; and
 means for rotatably driving said lead screw.

17. The drive assembly of claim 16 wherein said coupling means comprises a floating center coupling.

18. The drive assembly of claim 17 wherein said floating center coupling comprises a coupling block received about said lead screw between said push block and said lead screw nut and having an inner diameter sized for radial clearance with respect to said lead screw, and means for locking said coupling block against rotation with respect to said push block and said lead screw nut and for supporting said coupling block out of physical contact with said lead screw.

19. The drive assembly of claim 18 wherein said maintaining means comprises spring means for urging said push block into substantially symmetric axial bearing engagement with said coupling block and thereby urge said coupling block into substantially symmetric axial bearing engagement with said lead screw nut.

20. The drive assembly of claim 16 wherein said means for rotatably driving said lead screw comprises a reversible dc motor.

21. A drive assembly for linearly translating a record-playback head in a record-playback machine, comprising:
 a track assembly including a linear track member fixed with respect to the machine and a slide member mounted for linear translation on said track member, said head being mounted for linear movement with said slide member;
 a lead screw mounted on the machine for rotation about its own axis and extending in a direction generally parallel with the direction of translation of said slide member;
 a lead screw nut threadably received about said lead screw for axial translation with respect thereto in response to rotation of said lead screw;
 a push block mounted for linear movement with the head and received with radial clearance about said lead screw for axial translation with respect thereto generally along the lead screw;
 a floating center coupling between said push block and said lead screw nut for coupling said block and nut against rotation with respect to each other and for accommodating axial misalignment therebetween;
 spring means for urging said push block into annularly symmetric axially bearing engagement with said coupling for urging said coupling into annularly symmetric axially bearing engagement with said lead screw nut; and
 motor means for selectively and reversibly rotatably driving said lead screw.

22. The drive assembly of claim 21 wherein said floating center coupling comprises a coupling block received about said lead screw between said push block and said lead screw nut and having an inner diameter sized for radial clearance with respect to said lead screw, and means for locking said coupling block against rotation with respect to said push block and said lead screw out and for supporting said coupling block out of physical contact with said lead screw.

23. The drive assembly of claim 22 wherein said coupling block has a first face presented axially toward said push block with at least two radially projecting recesses formed therein to extend with both horizontal and vertical components of direction, and a second face presented axially toward said lead screw nut with at least two radially projecting recesses formed therein to extend with both horizontal and vertical components of direction and radially offset with respect to the recess formed in said first face, said locking means comporising pin means projecting axially from said push block and said lead screw nut for respective reception within said recesses in said first and second faces of said coupling block.

24. A drive assembly for linearly translating a record-playback head in a record-playback machine, comprising:
a linear track member fixed with respect to the machine;
a slide member mounted for linear translation on said track member, said head being mounted for linear movement with the slide member;
a lead screw mounted on the machine for rotation about its own axis and extending in a direction generally parallel with the direction of translation of said slide member;
means for selectively and reversibly rotatably driving said lead screw;
a lead screw nut threadably received about said lead screw for axial translation with respect thereto in response to lead screw rotation;
a push block mounted for linear movement with the head and received about said lead screw with radial clearance;
a coupling block received about said lead screw between said push block and said lead screw nut, and having an inner diameter for radial clearance with respect to said lead screw;
first coupling means between said push block and said coupling block for securing said push and coupling blocks against rotation relative to each other and for symmetrically loading said push and coupling blocks in response to axial forces therebetween;
second coupling means between said coupling block and said lead screw nut for receiving said coupling block and nut against rotation relative to each other and for symmetrically loading said coupling block and nut in response to axial forces therebetween; and
spring means for urging said push block, coupling block, and lead screw nut into axially bearing alignment along said lead screw.

25. The drive assembly of claim 24 wherein said coupling block has a first face presented axially toward said push block with at least two radially projecting recesses formed therein to extend with both horizontal and vertical components of direction, and a second face presented axially toward said lead screw nut with at least two radially projecting recesses formed therein to extend with both horizontal and vertical components of direction and radially offset with respect to the recesses formed in said first face, said first coupling means comprising at least two axially projecting members extending from said push block and received in the associated recesses formed in said coupling block and said second coupling means comprising at least two axially extending members extending from said lead screw nut and received in the associated recesses formed in said coupling block.

26. The drive assembly of claim 24 wherein said spring means comprises a spring coupled between the machine and said slide member for urging said slide member in a linear direction for urging said push block into axially bearing engagement with said coupling block.

27. The drive assembly of claim 26 including a tension barrel rotatably mounted on the machine, and wherein said spring comprises a substantially constant tension band spring connected between said barrel and said slide member.

28. A drive assembly for linearly translating a driven member with respect to a machine base, comprising:
a linear slide member mounted for linear translation with respect to the machine base, said driven member being mounted for linear movement with said slide member;
a lead screw mounted on the machine base for rotation about its own axis and extending in a direction generally parallel with the direction of translation of said slide member;
a lead screw nut threadably received about said lead screw for axial translation in response to lead screw rotation;
a push block mounted for linear movement with the driven member and received about said lead screw for axial translation with the driven member generally along said lead screw out of physical contact with said lead screw;
means for coupling said lead screw nut and said push block against rotation with respect to each other and for accommodating axial misalignment between each other; and
means for rotatably driving said lead screw.

29. The drive assembly of claim 28 wherein said coupling means comprises a floating center coupling.

30. The drive assembly of claim 29 wherein said floating center coupling comprises a coupling block received about said lead screw between said push block and said lead screw nut and having an inner diameter sized for radial clearance with respect to said lead screw, and means for locking said coupling block against rotation with respect to said push block and said lead screw nut and for supporting said coupling block out of physical contact with said lead screw.

31. The drive assembly of claim 30 including spring means for urging said push block into substantially symmetric axial bearing engagement with said coupling block and thereby urge said coupling block into substantially symmetric axial bearing engagement with said lead screw nut.

32. In a video record-playback machine having a record-playback head for use in recording and/or retrieving a video information signal from a rotatable video information disc, a drive assembly for linearly translating the head in a radial direction with respect to the disc, comprising:
a track assembly including a linear track member fixed with respect to the machine and a slide member mounted for linear translation on said track member, said head being mounted for linear movement with said slide member;
a lead screw mounted on the machine for rotation about its own axis and extending in a direction generally parallel with the direction of translation of said slide member;

a lead screw nut threadably received about said lead screw for axial translation with respect thereto in response to rotation of said lead screw;

a push block mounted for linear movement with the head and received with radial clearance about said lead screw for axial translation with respect thereto generally along the lead screw;

a floating center coupling between said push block and said lead screw nut for coupling said block and nut against rotation with respect to each other and for accommodating axial misalignment there between;

spring means for urging said push block into annularly symmetric axially bearing engagement with said coupling for urging said coupling into annularly symmetric axially bearing engagement with said lead screw nut; and motor means for selectively and reversibly rotatably driving said lead screw.

33. The drive assembly of claim 32 wherein said floating center coupling comprises a coupling block received about said lead screw between said push block and said lead screw nut and having an inner diameter sized for radial clearance with respect to said lead screw, and means for locking said coupling block against rotation with respect to said push block and said lead screw nut and for supporting said coupling block out of physical contact with said lead screw.

34. The drive assembly of claim 33 wherein said coupling block has a first face presented axially toward said push block with at least two radially projecting recesses formed therein to extend with both horizontal and vertical components of direction, and a second face presented axially toward said lead screw nut with at least two radially projecting recesses formed therein to extend with both horizontal and vertical components of direction and radially offset with respect to the recesses formed in said first face, said locking means comprising pin means projecting axially from said push block and said lead screw nut for respective reception within said recesses in said first and second faces of said coupling block.

35. The drive assembly of claim 32 wherein said spring means comprises a spring coupled between the machine and said slide member for urging said slide member in a linear direction for urging said push block into axially bearing engagement with said coupling block.

* * * * *